(12) United States Patent
Vassenkov et al.

(10) Patent No.: US 11,740,943 B2
(45) Date of Patent: *Aug. 29, 2023

(54) TECHNIQUES FOR MANAGING LONG-RUNNING TASKS WITH A DECLARATIVE PROVISIONER

(71) Applicant: Oracle International Corporation, Redwood Shores, CA (US)

(72) Inventors: Phillip Vassenkov, Seattle, WA (US); Nathaniel Martin Glass, Bellevue, WA (US); Eric Tyler Barsalou, Seattle, WA (US); Caleb Dockter, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,813

(22) Filed: Sep. 7, 2022

(65) Prior Publication Data

US 2023/0070404 A1 Mar. 9, 2023

Related U.S. Application Data

(63) Continuation of application No. 16/926,515, filed on Jul. 10, 2020, now Pat. No. 11,474,872.

(Continued)

(51) Int. Cl.
*G06F 9/50* (2006.01)
*G06F 8/71* (2018.01)
(Continued)

(52) U.S. Cl.
CPC .......... *G06F 9/5061* (2013.01); *G06F 3/0484* (2013.01); *G06F 8/60* (2013.01);
(Continued)

(58) Field of Classification Search
None
See application file for complete search history.

(56) References Cited

U.S. PATENT DOCUMENTS

2017/0109203 A1 4/2017 Liu et al.
2017/0207968 A1 7/2017 Eicken et al.
(Continued)

OTHER PUBLICATIONS

U.S. Appl. No. 16/926,515, Notice of Allowance dated Jul. 11, 2022, 9 pages.

(Continued)

*Primary Examiner* — Eric C Wai
(74) *Attorney, Agent, or Firm* — Kilpatrick Townsend & Stockton LLP

(57) ABSTRACT

Techniques for implementing an infrastructure orchestration service are described. In some examples, a declarative provisioner of the infrastructure orchestration service receives instructions for deployment of a resource. The declarative provisioner identifies that the deployment of the resource is a long-running task stores state information corresponding to the deployment of the resource. In certain embodiments, upon identifying that the deployment of the resource is a long-running task, the declarative provisioner pauses its execution of the long-running task. Responsive to a trigger received from the infrastructure orchestration service, the declarative provisioner resumes execution of the deployment of the resource using the state information and transmits deployment information corresponding to the deployment of the resource to the infrastructure orchestration service.

20 Claims, 10 Drawing Sheets

Related U.S. Application Data

(60) Provisional application No. 62/963,452, filed on Jan. 20, 2020, provisional application No. 62/963,456, filed on Jan. 20, 2020, provisional application No. 62/963,413, filed on Jan. 20, 2020, provisional application No. 62/963,486, filed on Jan. 20, 2020, provisional application No. 62/963,477, filed on Jan. 20, 2020, provisional application No. 62/963,335, filed on Jan. 20, 2020, provisional application No. 62/963,480, filed on Jan. 20, 2020, provisional application No. 62/963,489, filed on Jan. 20, 2020, provisional application No. 62/963,478, filed on Jan. 20, 2020, provisional application No. 62/963,491, filed on Jan. 20, 2020, provisional application No. 62/963,481, filed on Jan. 20, 2020.

(51) Int. Cl.

| | |
|---|---|
| *H04L 41/5054* | (2022.01) |
| *H04L 41/0816* | (2022.01) |
| *G06F 8/60* | (2018.01) |
| *H04L 41/5041* | (2022.01) |
| *H04L 41/50* | (2022.01) |
| *G06F 9/38* | (2018.01) |
| *G06F 9/4401* | (2018.01) |
| *H04L 41/0806* | (2022.01) |
| *G06F 9/48* | (2006.01) |
| *G06F 11/07* | (2006.01) |
| *G06F 11/32* | (2006.01) |
| *G06F 16/901* | (2019.01) |
| *G06F 9/445* | (2018.01) |
| *G06F 9/451* | (2018.01) |
| *G06F 3/0484* | (2022.01) |
| *H04L 67/00* | (2022.01) |
| *G06F 11/14* | (2006.01) |
| *G06F 11/36* | (2006.01) |
| *H04L 67/10* | (2022.01) |
| *H04L 67/1008* | (2022.01) |
| *H04L 67/1031* | (2022.01) |
| *H04L 67/566* | (2022.01) |
| *G06F 8/61* | (2018.01) |

(52) U.S. Cl.
CPC .............. *G06F 8/71* (2013.01); *G06F 9/3836* (2013.01); *G06F 9/4411* (2013.01); *G06F 9/44505* (2013.01); *G06F 9/451* (2018.02); *G06F 9/485* (2013.01); *G06F 9/4856* (2013.01); *G06F 9/505* (2013.01); *G06F 9/5011* (2013.01); *G06F 9/5022* (2013.01); *G06F 9/5027* (2013.01); *G06F 9/5038* (2013.01); *G06F 9/5072* (2013.01); *G06F 9/5077* (2013.01); *G06F 11/0757* (2013.01); *G06F 11/1469* (2013.01); *G06F 11/327* (2013.01); *G06F 11/3664* (2013.01); *G06F 11/3684* (2013.01); *G06F 16/9024* (2019.01); *H04L 41/0806* (2013.01); *H04L 41/0816* (2013.01); *H04L 41/5041* (2013.01); *H04L 41/5048* (2013.01); *H04L 41/5054* (2013.01); *H04L 41/5096* (2013.01); *H04L 67/10* (2013.01); *H04L 67/1008* (2013.01); *H04L 67/1031* (2013.01); *H04L 67/34* (2013.01); *H04L 67/566* (2022.05); *G06F 8/61* (2013.01)

(56) References Cited

U.S. PATENT DOCUMENTS

| | | |
|---|---|---|
| 2018/0024876 A1 | 1/2018 | Addison et al. |
| 2018/0210763 A1 | 7/2018 | Kumar et al. |
| 2021/0073625 A1 | 3/2021 | Cai |

OTHER PUBLICATIONS

U.S. Appl. No. 17/150,778, Notice of Allowance dated Apr. 13, 2023, 11 pages.

TECHNIQUES FOR MANAGING LONG-RUNNING TASKS WITH A DECLARATIVE PROVISIONER

CROSS-REFERENCE TO RELATED APPLICATIONS

The present application is a continuation of, and claims the benefit of and priority to, U.S. patent application Ser. No. 16/926,515 filed on Jul. 10, 2020, the entire contents of which are incorporated herein by reference for all purposes.

U.S. patent application Ser. No. 16/926,515 is a non-provisional application of, and claims the benefit and priority under 35 U.S.C. 119(e) of the following U.S. Provisional Applications, the entire contents of which are incorporated by reference for all purposes:

U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL";

U.S. Provisional Application No. 62/963,413, filed Jan. 20, 2020, entitled "TECHNIQUES FOR DETECTING DRIFT IN A DEPLOYMENT ORCHESTRATOR";

U.S. Provisional Application No. 62/963,456, filed Jan. 20, 2020, entitled "USER INTERFACE TECHNIQUES FOR AN INFRASTRUCTURE ORCHESTRATION SERVICE";

U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS";

U.S. Provisional Application No. 62/963,478, filed Jan. 20, 2020, entitled "TECHNIQUES FOR RESOLVING APPLICATION UPDATES";

U.S. Provisional Application No. 62/963,480, filed Jan. 20, 2020, entitled "TECHNIQUES FOR MANAGING DEPENDENCIES OF AN ORCHESTRATION SERVICE";

U.S. Provisional Application No. 62/963,452, filed Jan. 20, 2020, entitled "TECHNIQUES FOR ROLLBACK OF AN INFRASTRUCTURE ORCHESTRATION SERVICE";

U.S. Provisional Application No. 62/963,486 filed Jan. 20, 2020, entitled "TECHNIQUES FOR DEPLOYING INFRASTRUCTURE COMPONENTS IN PHASES";

U.S. Provisional Application No. 62/963,489, filed Jan. 20, 2020, entitled "TECHNIQUES FOR MANAGING LONG-RUNNING TASKS WITH A DECLARATIVE PROVISIONER";

U.S. Provisional Application No. 62/963,481, filed Jan. 20, 2020, entitled "TECHNIQUES FOR TRANSFERRING DATA ACROSS AIR GAPS"; and U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS".

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

This disclosure relates generally to provisioning and deploying infrastructure resources within a cloud environment. More specifically, but not by way of limitation, this disclosure relates to a cloud infrastructure orchestration service that implements techniques for efficiently provisioning and deploying infrastructure resources within a cloud environment.

In certain embodiments, a method for provisioning and deploying infrastructure resources within a cloud environment is disclosed. The method involves receiving, by a declarative provisioner, instructions for deployment of a resource using at least a provider implementation and a worker implementation. The method involves determining, by the declarative provisioner, that the deployment of the resource is a long-running task. The method then involves invoking, by the declarative provisioner, the provider implementation to execute the deployment of the resource. The method further involves instructing, by the declarative provisioner, the provider implementation to return an error message based on the determination that the deployment of the resource is a long-running task and storing state information corresponding to the deployment of the resource based on the error message.

In certain examples, the method involves instructing, by the declarative provisioner, the worker implementation to treat the error message as a yield instruction. In certain examples, the yield instruction indicates to the worker implementation that execution of the deployment of the resource is paused. In certain embodiments, the method involves receiving, by the declarative provisioner, a trigger from the worker implementation that causes the declarative provisioner to resume execution of the deployment of the resource using the state information. The method further involves, responsive to the trigger, transmitting, by the declarative provisioner, deployment information corresponding to the deployment of the resource to the worker implementation.

In certain embodiments, the method involves determining that the deployment of the resource is a long-running task by identifying that an execution time for deploying the resource exceeds a threshold amount of time. In certain examples, the threshold amount of time is greater than five minutes. In certain examples, the method involves updating, by the declarative provisioner, the state information based on the error message to generate modified state information corresponding to the deployment of the resource. In certain examples, the modified state information comprises a modified state of the resource being created, a logical identifier associated with the resource being created and a yield state or a yield condition associated with the resource being created.

In certain embodiments, the method involves receiving, by the worker implementation, the modified state information corresponding to the deployment of the resource and identifying, by the worker implementation, based on the modified state information, the yield state and the yield condition is associated with the resource being deployed. In certain embodiments, the method involves identifying, by the worker implementation, and based on the modified state information, the logical identifier of the resource being deployed and marking, by the worker implementation, the identified resource as un-tainted in the modified state information using the logical identifier associated with the resource.

In certain embodiments the method involves identifying, by the declarative provisioner, based on the modified state information, that the execution of the deployment of the resource is paused. The method further involves determining, by the declarative provisioner, that the yield condition associated with the deployment of the resource is not satisfied. In certain examples, responsive to the determining, the method involves, executing, by the declarative provisioner, an update operation on the resource being deployed and responsive to executing the update operation, updating, by the declarative provisioner, the modified state information. The method further involves transmitting, by the declarative provisioner, the modified state information to the worker implementation.

In certain embodiments, the method involves identifying, by the declarative provisioner, that the resource is untainted and that a yield state associated with the resource is set. The method further involves updating the yield state associated with the resource in the modified state information to indicate that the resource is still yielding.

In certain embodiments, the method involves identifying, by the declarative provisioner, based on the modified state information, that the execution of the deployment of the resource is paused. The method further involves determining, by the declarative provisioner, that the yield condition associated with the resource is satisfied and determining, by the declarative provisioner, that the resource has been successfully created. In certain examples, the method involves, responsive to determining that the resource has been successfully created, modifying, by the declarative provisioner, the yield state associated with the resource in the modified state information to indicate that the resource is no longer yielding and transmitting, by the declarative provisioner, the modified state information to the worker implementation.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
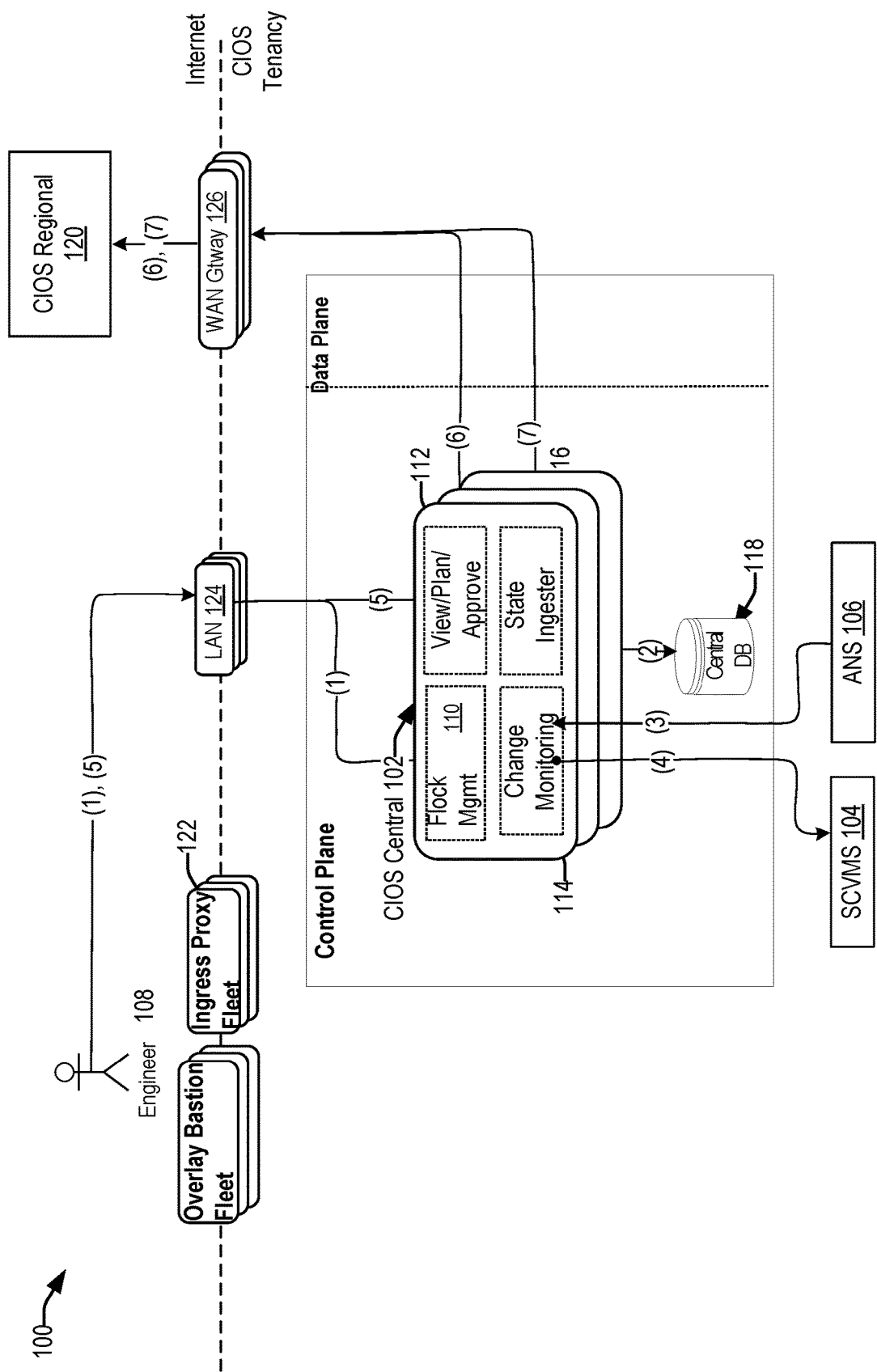
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). Additional details related to the techniques employed by the CIOS Central and CIOS Regional components for provisioning and deploying of infrastructure assets within a cloud environment is described in FIGS. 1-2 below.

In certain embodiments, the CIOS Regional component is configured to manage regional instances and/or deployments of CIOS Central and store and manage execution plans that pertain to a particular region. In certain examples, the CIOS Regional System is configured to orchestrate (e.g., co-ordinate) the execution of a plan to provision and deploy the infrastructure resources defined in a configuration file by breaking the plan down into a series of tasks.

In certain embodiments, the CIOS Regional System may be configured to identify a task as a "long-running" task. As described herein, a long-running task is a task (or a process) that may end up waiting for a capability (e.g., for some other external event) to become available and/or to occur before it can complete its execution. For instance, a long-running task may be identified as a task (e.g., a regional deployment) such as the creation and deployment of a resource" that may take an extended period of time (e.g., days, weeks, etc.) to complete its execution. In certain embodiments, upon identifying that the provisioning and/or deployment of a resource is a "long-running" task, the CIOS Regional System enables a provisioning tool to "pause" the execution of the "long-running" task and resume it later when a particular capability that the CIOS Regional System is waiting for becomes available. In certain embodiments, the CIOS Regional System also includes capabilities for preserving the "state" of a "paused" or "yielded" long-running task by "un-tainting" a resource identified as being provisioned in the task. By "un-tainting" the resource, the CIOS Regional System enables the provisioning tool to not be forced to delete (destroy) and re-create the resource that is in the middle of being provisioned when it is re-trigged.

By enabling the provisioning tool to "pause" or "yield" a currently executing task as described above, the CIOS Regional System is able to handle the execution of long-running tasks by the provisioning tool in an efficient manner. The techniques used by the CIOS Regional System described herein can effectively save many compute cycles by having a currently executing task (i.e., thread) of the provisioning tool pause and then resume later, leading to massive efficiency gains and memory-usage gains, especially for long-running tasks by avoiding too many instances (i.e., process threads) of the provisioning tool waiting at the same time. In certain examples, using the disclosed technique, the provisioning tool may be configured to execute a number (e.g., five or six) long-running tasks concurrently. Additional details of the techniques employed by the CIOS Regional System for provisioning and deploying infrastructure resources for users in a cloud environment is discussed in detail in FIGS. 5-7 of the present disclosure.

The following terms will be used throughout the present disclosure:

Infrastructure component—A long-lived piece of infrastructure that supports running code.
  Examples: a deployment application, a load balancer, a domain name system (DNS) entry, an object storage bucket, etc.
Artifact—Code being deployed to a deployment application or a Kubernetes engine cluster, or configuration information (hereinafter, "config") being applied to an infrastructure component. These may be read-only resources.
Deployment task—A short-lived task that is often associated with deploying or testing code. Additionally, the deployment tasks are modeled as resources that live no longer than the release that creates them.
  Examples: "deploy $artifact to $environment," "watch $alarm for 10 minutes," "execute $testSuite," or "wait for $manualApproval"
  For example, CIOS can model a deployment orchestrator deployment as the creation of a resource that transitions to the Available state when it completes.
  Because CIOS maintains the state of its associated declarative provisioner, CIOS can control the lifecycle of these short-lived resources as it relates to releases.
Resource—a CRUD'able resource.
  CIOS models each of the constructs listed above as a resource. The next section discusses this modeling in detail.
Flock—CIOS's model encapsulating a control plane and all its components. Exists primarily to model ownership of and point at the infrastructure components.
Flock config—Describes the set of all infrastructure components, artifacts, and deployment tasks associated with a single service.
  Each Flock has exactly one Flock configuration. Flock configurations are checked in to source control.
  Flock configurations are declarative. They expect CIOS to provide realm, region, ad, and artifact versions as input.
  Flocks are granular—a Flock consists of a single service and supporting infrastructure.
State—A point-in-time snapshot of the state of every resource in the flock.
Release—A tuple of a specific version of a flock configuration and a specific version of every artifact that it references.
  Think of a release as describing a state that may not yet exist.
Release plan—The set of steps that the CIOS would take to transition all regions from their current state to the state described by a release.
  Release plans have a finite number of steps and a well-defined start and end time.
Apply—This is a noun. A single attempt to execute a Release plan. An Execution changes the current State of the Flock.

CIOS can be described as an orchestration layer that applies configuration to downstream systems (e.g., worldwide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.
Helping teams plan and release new changes.
Coordinating activity across various downstream systems within a region to execute approved release plans with no human intervention.
Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS configuration (which, can itself be an artifact). Additionally, teams can inspect these plans, and may iterate on them by changing the CIOS configuration and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure configuration (e.g., provisioning) in one system. CIOS also supports flexible ordering across regions, and across components within a region. Teams can express ordering via checked-in configuration. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.
Storing an authoritative mapping of Flock metadata to the deployment artifacts and CIOS repositories for the flock.
Coordinating global Releases across Phases and Targets.
Synchronization to enforce policies like "no more than one ongoing release to a Flock at a time."
Detecting changes to Flock configuration (configuration) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock configuration, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
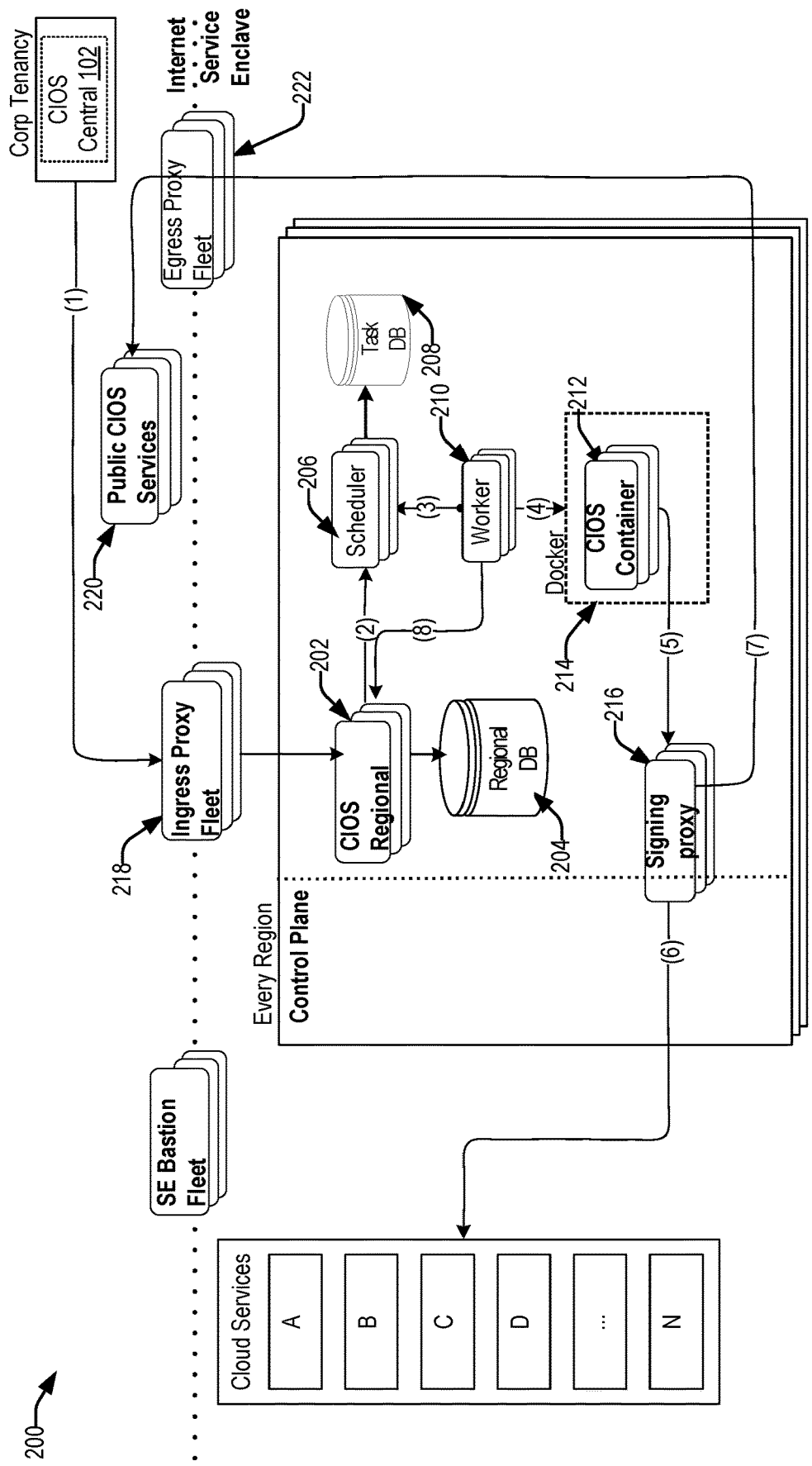
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 120. In some examples, CIOS Regional 120 is where much of the work of declarative provisioning and planning, as well as approved release application can occur. In some instances, each instance of CIOS Regional 120 may have a CIOS regional front end that can handle operations at the level of "Execution Targets." It can be configured to perform the following:

Handling all CIOS Authentication for incoming operations from CIOS Central 102.

Enforcing a rule that only one "execution" (plan/import resources/apply plan) can be ongoing for a given Execution target at a time.

Managing binary artifact storage for declarative provisioning artifacts used for input and output during declarative infrastructure provisioning execution. Examples of input are declarative infrastructure provisioning configuration files and an input state file. Typical output is a final state file.

Requesting work from and polls for results from the CIOS Executor for any given execution.

In some instances, the CIOS regional Frontend may be dependent on an Executor 206 (also referred to herein as a "scheduler), which can handle the actual execution. The Executor, in some examples, operates at the level of "Execution," and it can:

Track a pool of available Worker nodes

Query incoming job requests, and assigns them to eligible workers as available

Track worker status and Execution updates for reporting to clients

Detect dead nodes via a leasing protocol, and can fail tasks assigned to dead nodes, depending on task status.

Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:

start containers for polls task items that do not exist locally kill containers for locally running containers that have no corresponding assigned task item Report status for jobs Stage input and output for job container execution Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the roll-back plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries—enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
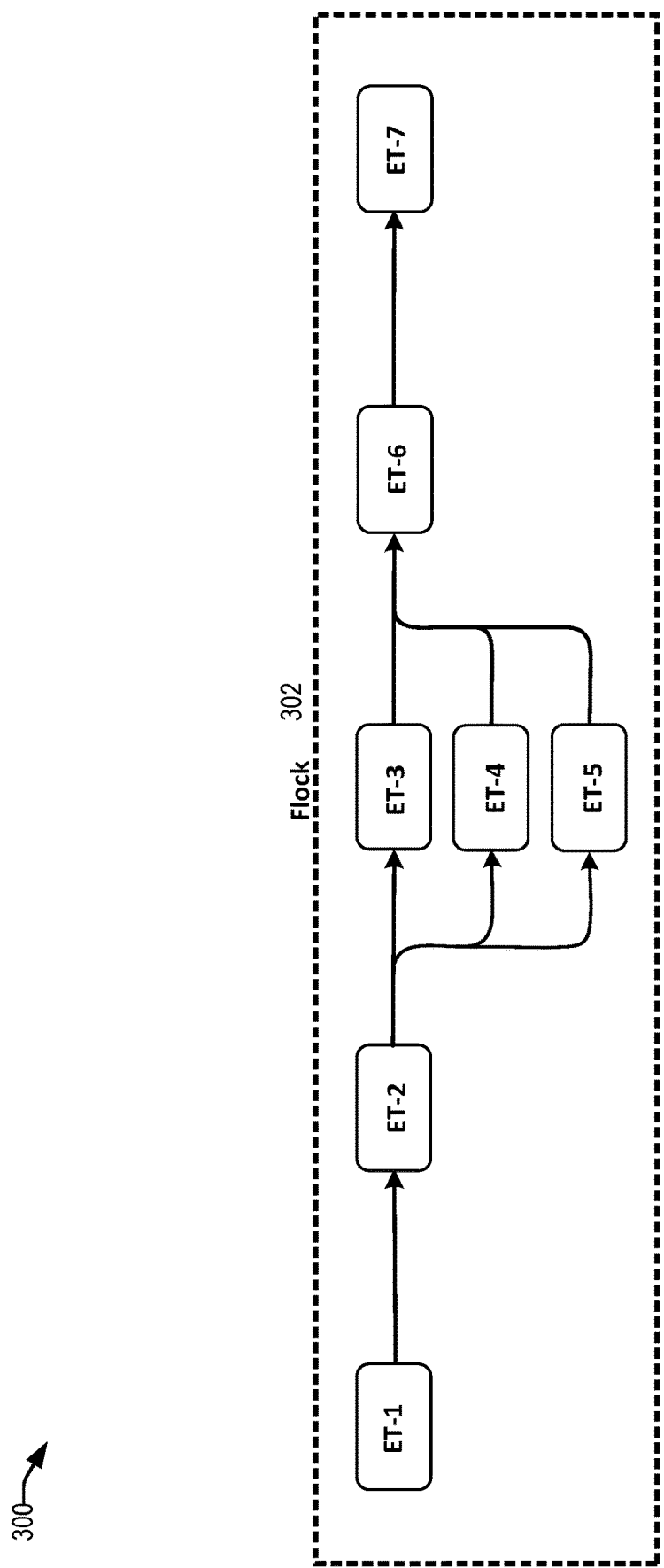
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an ExecutionTarget (ET)—this is all over our internal APIs, but does not leak out in to the flock config. CIOS executes ETs based on the DAG 200 defined in the flock config. Each ET (e.g., ET-1, ET-2, ET-3, ET-4, ET-5, ET-6, and ET-7) is, roughly, one copy of the service described by the flock config.

Figure 4:
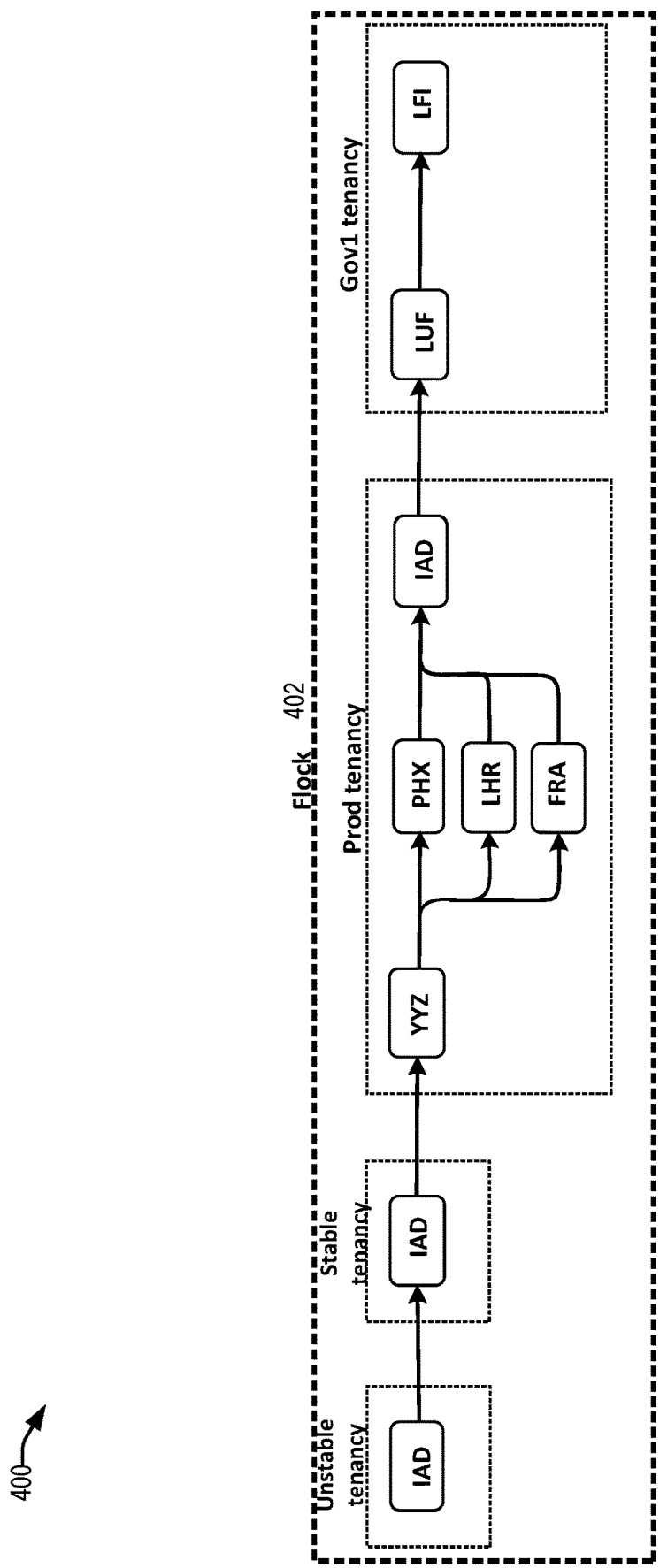
FIG. 4 is a flow diagram for illustrating an example flock, according to at least one embodiment.

FIG. 4 depicts a DAG 400 for illustrating and example flock 402. In the flock config, CIOS is very opinionated about how teams express this progression—they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm—in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

In some examples, a refresh plan can be used to allow CIOS to exit a currently running (e.g., long-running) process (e.g., a deployment or the like) and wake up the next day (or some other time later), and pick up where the process left off. CIOS is inherently stateful. The system (e.g., service) knows what operations are in flight, that an instance is currently being created or deployed, and/or how to watch for that to finish so that it can do the next thing. In some examples, some of the operations (e.g., region deployments) may take an extended period of time (e.g., days, weeks, etc.). It could be detrimental to have to keep a single running process around for that extended period of time, hoping that nothing happens to that process (e.g., processor should not be disconnected), just so that it can retain its state. So, CIOS was built to be able to go to sleep, and preserve state (e.g., externally), and then wake back up and pick it back up again. In some instances, the state may be preserved externally by having a worker implementation manage the state, while a provider implementation sleeps.

Figure 5:
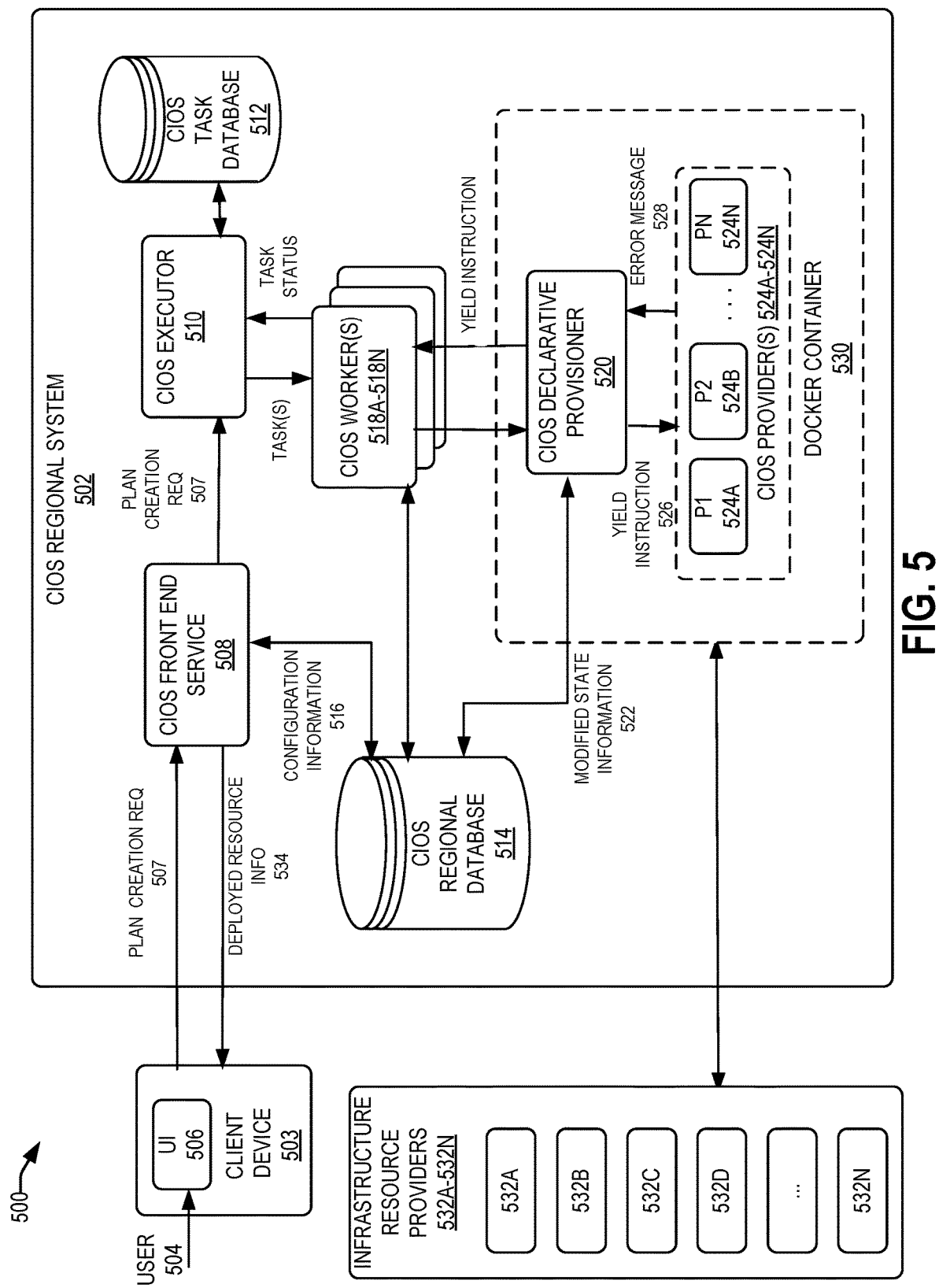
FIG. 5 depicts an example of a CIOS Regional System for automatically provisioning and deploying infrastructure resources within a cloud environment, according to certain embodiments.

In certain embodiments, the functionality provided by CIOS Regional Service 202 (depicted in FIG. 2) may be implemented by a CIOS Regional System 502 as shown in FIG. 5. CIOS Regional System 502 is configured to manage regional instances and/or deployments of CIOS Central 102 (shown in FIG. 1) and store and manage execution plans that pertain to a particular region. FIG. 5 depicts an example of a CIOS Regional System 502 for automatically provisioning and deploying infrastructure resources within a cloud environment, according to certain embodiments. CIOS Regional System 502 and its subsystems may be implemented using software (e.g., code, instructions, program) executed by one or more processors, hardware, or combinations thereof. The software may be stored on a non-transitory storage medium (e.g., on a memory device). CIOS Regional System 502 may be implemented by one or more computing systems. For example, one or more computing systems may execute the software (e.g., code, instructions, program) implementing CIOS Regional System 502. In the embodiment depicted in FIG. 1, CIOS Regional System 502 includes a CIOS Front End Service 508, a CIOS Executor 510, a pool of CIOS Workers 518A-518N and a CIOS declarative provisioner 520. Portions of data or information used and/or generated by CIOS Regional System 502 as part of its processing may be stored in a persistent memory (e.g., CIOS Regional Database 514 and CIOS Task Database 512) of CIOS Regional System 502.

Similar to what was depicted in FIG. 1, a user (e.g., user 504) may interact with CIOS Regional System 502 using a client device 503 that is communicatively coupled to CIOS Regional System 502, possibly via one or more communication networks. Client device 503 may be of various types, including but not limited to, a mobile phone, a tablet, a desktop computer, or the like. User 504 may interact with CIOS Regional System 502 using an application (e.g., a browser) executed by client device 503. For example, user 504 may use a user interface (UI) 506 (which may be a graphical user interface (GUI)) of an application executed by client device to interact with CIOS Regional System 502 and may, via UI 506, submit a request to CIOS Regional System 502 to provision and deploy infrastructure resources within a virtual cloud environment. In certain examples, user 504 may be a developer and/or an administrator within CIOS Regional System 502 who manages and/or utilizes the provisioning and deployment services provided by CIOS Regional System 502. In other instances, user 504 may be an external user (e.g., a subscriber or a customer) of CIOS Regional System 502.

In certain embodiments, user 504 may submit a request to CIOS Regional System 502 to provision and deploy infrastructure resources in a particular region by submitting a "plan creation request" 507. In certain examples, the "plan creation request" may include a configuration file that declaratively describes the configuration of the infrastructure resources (also referred to herein as "infrastructure elements") to be created (e.g., provisioned) and deployed and the manner in which the infrastructure resources interact with one another. The infrastructure resources may include, without limitation, virtual private clouds (VPCs) (e.g., a potentially on-demand pool of configurable and/or shared computing resources), security group rules (that define how the security of the network will be set up), virtual machines (VMs), load balancers, databases, deployment configurations and the like. Additionally, the configuration file may describe the relevant fields needed to create each infrastructure resource of the infrastructure. For instance, the configuration file may describe a VPC resource and the fields required to create the VPC resource. As the infrastructure incrementally evolves, the user may update the configuration file to add new infrastructure elements and also reference the new elements with previously described elements in the infrastructure.

In certain examples, CIOS Front End Service 508 receives the "plan creation request" and forwards it to CIOS Executor 510. CIOS Executor 510 then orchestrates (e.g., co-ordinates) the execution of a Plan to provision and deploy the infrastructure resources defined in the configuration file by breaking the Plan down into a series of Tasks. In certain examples, the Tasks are stored in CIOS task database 512. A Task, as defined herein, represents the finest grain of work that can be tracked (e.g., a Task can represent a single containerized process execution) by CIOS Executor 510. Examples of Tasks may include, for instance, "create a VPC (or core network)," "provision security group rules," "provision VMs," "provision a load balancer," "create a Deployment Orchestrator Resource," and so on.

In certain embodiments, CIOS Executor 510 may determine that a Task identified in the Plan is a long-running task (also referred to herein as a "long-running process"). As noted above, a long-running task is a task (or a process) that may end up waiting for a capability (e.g., for some other external event) to become available and/or to occur before it can complete its execution. In the scenario where a long-running task is awaiting a capability, CIOS (e.g., CIOS Regional System) may be requested to provision resources during a new datacenter bootstrap where the responsible control plane is not available yet and needs to wait for it to become available. A long-running task may also be a task that is defined by a certain task-completion time. The task-completion time can be defined by a threshold value that can range from a lower limit of about five minutes to an upper limit of about a few weeks. Examples of long running tasks may include, for instance, computer provisioning tasks which typically take 5-10 minutes to complete or deployment tasks (e.g., "creation of a Deployment Orchestrator Resource,") that may take several days to complete due to the size of the fleet and deployment speed preferences. Another example of a long running task is a "gate" task, which does nothing except wait for some period of time to pass before allowing execution to continue. This can be useful for customers that instruct CIOS to continue executing only after letting deployed code run on the deployed system for a period of time. This is to limit the blast radius of a deployment where errant behavior crops up only after the system has had sufficient load applied. Yet another example of a gate task is where CIOS customers have policy restricting them to make changes only during certain time windows.

In certain embodiments, CIOS Executor 510 orchestrates (e.g., co-ordinates) an Execution of the Tasks identified in a Plan by identifying a CIOS Worker (e.g., 518A) from a pool of available CIOS Workers (518A-518N) to execute each Task identified in the Plan. For instance, CIOS Executor 510 may track a pool of available CIOS Workers 518A-518N and assign a Task stored in CIOS Task database 512 to an available CIOS Worker (e.g., 518A) from the pool. In certain embodiments, the pool of CIOS Workers 518A-518N rely on CIOS Executor 510 for the coordination of Tasks identified in the plan. CIOS Executor 510 is responsible for managing CIOS Worker fleet capacity, assigning tasks to CIOS Workers 518A-518N, and keeping track of Task state. In certain embodiments, CIOS Workers 518A-518N can be implemented as a fleet of Java Virtual Machines (JVMs) that manage one or more CIOS declarative provisioning images.

In certain examples, an agent executing on the CIOS Workers 518A-518N may be configured to periodically ping CIOS Executor 510 with heartbeats. For instance, a heartbeat may correspond to a periodic signal that is transmitted by a CIOS Worker to the CIOS Executor to inform the CIOS Executor of the status of its running Tasks as well as its resource usage and general health. CIOS Executor 510 may be configured to track worker state in order to know where it can successfully schedule work. After an agent becomes unhealthy or unresponsive, CIOS executor 510 is capable of reassigning its current running task to a different CIOS Worker. Thus, CIOS Executor 510 is capable of tracking the overall progress of an Execution. In addition to the current Execution and the Task currently assigned to it, CIOS Executor 510 is also capable of tracking the history of Tasks for the Execution of a Plan. Once a Task is complete, the agent on a CIOS Worker (e.g., 518A) is configured to report a Task completion result to CIOS Executor 510, which can then update a job state for the CIOS Worker. Upon Task completion, the agent on the CIOS Worker may also be configured to update a state file (that stores state information about provisioned resources) stored in CIOS Regional DB 514.

In certain embodiments, CIOS Workers 518A-518N may (via CIOS Executor 510) be configured to read input data from and write output data to one or more APIs associated with CIOS Frontend service 508. Examples of input data are configuration files, starting state files and import mappings that may be stored in CIOS Regional database 514 Examples of output data may include output declarative provisioning state files and import result states also stored in CIOS Regional database 514. CIOS Regional Database 514 may be a region's subset of CIOS Central DB 118 (shown in FIG. 1). CIOS Regional Database 514 may be configured to manage configuration files and state files for regional instances and/or deployments of CIOS in the particular region.

In certain embodiments, CIOS Executor 510 may be configured to co-ordinate the execution of a set of Tasks identified in a Plan "serially" by transmitting an instruction to a CIOS Worker (e.g., CIOS Worker 518A) from the pool of CIOS Workers 518A-518N to execute a first Task in the set of Tasks. CIOS Worker 518A receives the instruction from CIOS Executor 510 and invokes CIOS Declarative Provisioner 520 to execute the Task. In certain embodiments, CIOS Declarative Provisioner 520 is configured to create (e.g., provision) and deploy the resources identified in the Task. In a certain implementation, CIOS Declarative Provisioner 520 may execute declarative provisioning actions in its own private Docker Container 530. In certain embodiments, CIOS Declarative Provisioner 520 comprises one or more CIOS Providers 524A-524N that can query one or more infrastructure resource providers (532A-532N) to create, manage and update infrastructure resources (e.g., physical machines, Virtual Machines, network switches, containers and the like) for users of the CIOS Regional System 502 on one or more target systems. In certain examples, infrastructure resource providers 532A-532N may include one or more service providers providing services under an Infrastructure as a Service (IaaS) category. In certain examples, CIOS Providers 524A-524N are implementations wrapping CRUD operations to downstream services, which tell CIOS which API calls to make in order to provision a new resource, read state of existing resources, update resources, or destroy resources in a downstream service, along with any bookkeeping required to maintain the internal CIOS state.

As discussed above, in certain examples, CIOS Worker 518A receives an instruction from CIOS Executor 510 to execute a Task. CIOS Worker 518A then communicates with CIOS Declarative Provisioner 520 to execute the Task. In certain embodiments, and as will be described in greater detail below, CIOS Regional System 502 is configured to control a provider implementation (e.g., a Provider P1 managed by CIOS Declarative Provisioner 520) and a worker implementation (e.g., a CIOS Worker). In certain examples, CIOS Regional System 502 is configured to enable the provider implementation to return an "error" to the worker implementation that the worker implementation interprets as a "yield" instruction that execution of a long running task has been paused. The worker implementation receives the "yield" instruction, preserves the state of the currently running Task externally, and wakes the Task back up at a later time to resume its execution. As an example, if a capability that the CIOS Regional System is waiting for, isn't available, the particular thread (e.g., the process or CIOS declarative provisioner instance) that is waiting is instructed to yield until the capability is available. That way, the instance isn't waiting for a half-up identity (e.g., some process that was in the process of deploying, but may be waiting on something else to finish) or other resource. Additional details related to the operations performed by CIOS Regional System 502 for provisioning and deploying resources using a provider implementation and a worker implementation are described in FIG. 6 and FIG. 7 below.

As a result of provisioning performed by CIOS Declarative Provisioner 520, information related to deployed resources 534 may be made available to user 504 of CIOS Regional System 502. For example, the deployed resource information 534 may include information about the infrastructure resources that were provisioned by the CIOS Regional System on one or more target systems.

Computing environment 500 depicted in FIG. 1 is merely an example and is not intended to unduly limit the scope of claimed embodiments. Various alternatives and modifications are possible. For example, in some implementations, CIOS Regional System 502 can be implemented using more or fewer subsystems than those shown in FIG. 1, may combine two or more subsystems, or may have a different configuration or arrangement of subsystems.

Additionally, for purposes of the present disclosure, the terms "CIOS Executor" and "Scheduler" may be employed interchangeably herein. The terms "CIOS Workers" and "Worker" may be employed interchangeably herein. The terms "CIOS Declarative Provisioner" and "CIOS Container" may be employed interchangeably herein. The terms "CIOS Regional Database" and "Regional DB" may be employed interchangeably herein and the terms "CIOS Task Database" and "Task DB" may be employed interchangeably herein.

Figure 6:
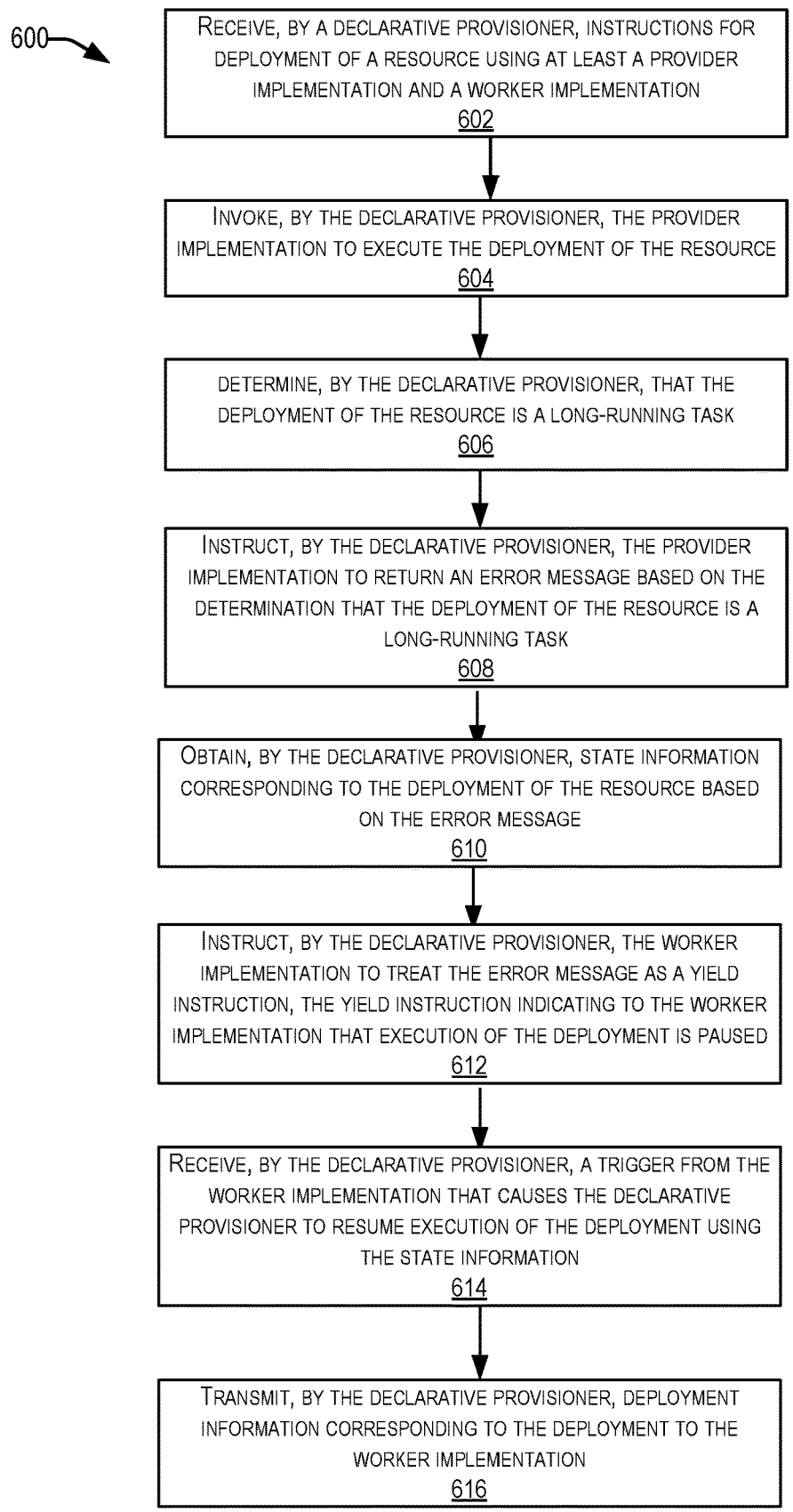
FIG. 6 illustrates an example flow diagram showing a process for deploying infrastructure resources defined in a configuration file by the CIOS Regional System shown in FIG. 5, according to certain embodiments.

FIG. 6 illustrates an example flow diagram showing a process 600 for deploying infrastructure resources defined in a configuration file by the CIOS Regional System shown in FIG. 5, according to certain embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 600 may be performed by a plurality of processors in parallel. The computer-readable storage medium may be non-transitory. In certain embodiments, such as in the embodiment depicted in FIG. 5, the processing depicted in blocks 602-616 in FIG. 6 may be performed by CIOS Executor 510, CIOS Worker(s) 518A-518N, CIOS Declarative Provisioner 520 and CIOS Provider(s) 524A-524N.

The process 600 begins at block 602, where the process 600 involves receiving, by a declarative provisioner (e.g., CIOS Declarative Provisioner 520) instructions for deployment of a resource using at least a provider implementation (e.g., P1 524A) and a worker implementation (e.g., CIOS Worker 518A). In certain embodiments, the operations performed at block 602 may include, receiving by CIOS Declarative Provisioner 520 a Task (that identifies instructions for deployment of a resource) from CIOS Worker 518A.

At block 604, process 600 involves invoking, by the declarative provisioner, the provider implementation (e.g., CIOS Provider P1 524A) to execute the deployment of the resource.

At block 606, process 600 involves determining, by the declarative provisioner, that the deployment of the resource is a long-running Task. For instance, a long-running Task may be identified as a Task (e.g., a region deployment) such as the creation and deployment of a resource that may take an extended period of time (e.g., days, weeks, etc.) to complete its execution.

At block 608, process 600 involves instructing, by the declarative provisioner, the provider implementation to return an "error message" 528 based on the determination that the deployment is a long-running task. In certain examples, the operations performed at block 608 may involve transmitting, by CIOS Declarative Provisioner 520, a "yield instruction" 526 to CIOS Provider P1 524A that is attempting to provision the resource identified in the Task to "yield" (or pause) execution of the Task (e.g., to pause the creation and deployment of the resource) until a capability that CIOS Declarative Provisioner 520 is waiting for becomes available.

In certain embodiments, in response to receiving the "yield instruction" as indicated above, CIOS Provider P1 524A returns an "error message" to CIOS Declarative Provisioner 520. In certain examples, the "error message" contains a "non-standard error code" that indicates to CIOS Declarative Provisioner 520 that CIOS Provider P1 524A has yielded (paused) the execution of the task (i.e., the creation and deployment of the resource). This enables CIOS Declarative Provisioner 520 to exit its currently executing long-running Task (i.e., process thread) and resume it later when the capability that it is waiting for becomes available. By instructing CIOS Provider P1 524A to return an "error message" comprising a "non-standard error code" for a resource that it is attempting to create, CIOS Declarative Provisioner 520 overrides the default behavior of CIOS Provider P1 524A of returning a "standard error code" for a resource that it is attempting to create. As described herein, a "standard error code" is an error code that is typically returned, by default, by Provider P1 524A during resource creation. The "standard error code" is used to indicate to CIOS Declarative Provisioner 520 that Provider P1 524A will automatically delete and re-create a resource in the event of failure to create the resource or when CIOS Declarative Provisioner 520 is automatically re-invoked.

In certain embodiments, upon receiving the "error message" containing the "non-standard error code," as described above, the process 600 may involve, at block 610, obtaining, by the declarative provisioner, state information corresponding to the deployment of the resource. For instance, the operations performed at block 610 may involve, obtaining by CIOS Declarative Provisioner 520 a state file (that is stored in CIOS Regional DB 514) comprising the state information and updating the state file to generate modified state information (e.g., 522) corresponding to the deployment of the resource. In certain examples, the modified state information corresponding to the deployment of the resource may include the following information:

(1) A modified state of the resource being deployed. In certain examples, the modified state may be represented as a partially filled in "STATE" (e.g., a CREATING STATE) for the identified resource that is still being created.

(2) A "yield state" with a corresponding "yield condition" for the resource being created. The "yield condition" identifies a condition that must be satisfied for the resource to be successfully created (i.e., provisioned and deployed), i.e., for the Task to be successfully executed. Examples of a "yield condition" may include for instance, "WAIT_FOR_5_MINUTES," "WAIT_FOR_EVENT_FROM_REMOTE_SYSTEM (e.g. wait for a deployment to complete from an event stream)," and the like.

(3) A logical identifier associated with the resource being created. By default, the logical identifier associated with the resource is initially marked as "tainted" by CIOS Declarative Provisioner 520. By marking a resource as "tainted," CIOS Declarative Provisioner 520 is, by default, forced to destroy and re-create the resource when it executes an "Apply Plan" (i.e., "Execute Plan") operation.

In block 612, the process 600 involves, instructing, by the declarative provisioner, the worker implementation to treat the "error message" as a "yield instruction." The "yield instruction" indicates to the worker implementation that execution of the deployment is paused. In certain examples, upon receiving the "yield instruction" the worker implementation (e.g., CIOS Worker 518A) executes the following operations. The worker implementation receives the modified state information corresponding to the deployment of the resource from the CIOS Declarative Provisioner and identifies, based on the modified state information, that a yield state and a yield condition is associated with the resource being deployed. The worker implementation then identifies, based on the modified state information, the logical identifier of the resource being deployed and marks the identified resource as "un-tainted."

In certain examples, marking a resource as "un-tainted" may involve removing, by the worker implementation (e.g., CIOS Worker 518A), the "taint flag" associated with the resource using its logical identifier. By "un-tainting" the resource, CIOS Worker 518A is now able to preserve the state of the resource while CIOS Declarative Provisioner 520 has paused deployment of its currently executing long-running task. The "un-tainting" of the resource also forces CIOS Declarative Provisioner 520 to perform an "Update" operation instead of performing a default "Create" operation followed by a "Delete" operation (that forces the resource that is still being created to be destroyed and re-created when CIOS Declarative Provisioner 520 re-triggered) when it is re-triggered by CIOS Worker 518A to resume execution of its long-running task.

By enabling CIOS Provider P1 524A to "yield" its currently executing Task as described in block 608 above, CIOS Regional System 502 is able to handle the execution of long-running tasks by CIOS Declarative Provisioner 520 efficiently. The disclosed technique enables high memory-usage gains by avoiding too many instances (i.e., process threads) of the CIOS Declarative Provisioner 520 waiting at the same time. Without the ability to enable Provider P1 524A to "yield" a currently executing task, the number of concurrently running threads of CIOS Declarative Provisioner 520 would be more than a computer's memory is capable of handling. For example, CIOS Declarative Provisioner 520 would not be cost effective, at least because CIOS Declarative Provisioner 520 would end up being run on many different machines, but many of them would be doing nothing, essentially consuming RAM to wait. Additionally, by enabling CIOS Worker (e.g., 518A) to preserve the state of a yielded task currently being executed by CIOS Declarative Provisioner 520 by "un-tainting" (i.e., by removing the "taint flag" of) the resource, CIOS Declarative Provisioner 520 is not forced to delete (destroy) and re-create a resource that is in the middle of being provisioned every time it is triggered or re-executed. Thus, the techniques used by CIOS Regional System 502 described herein can effectively save many compute cycles by having a currently executing task (i.e., thread) of CIOS Declarative Provisioner 520 exit and then resume later, leading to massive efficiency gains, especially for long-running tasks. In certain examples, using the disclosed technique, CIOS Declarative Provisioner 520 may be configured to execute a number (e.g., five or six) long-running tasks concurrently.

After the resource is "un-tainted" by CIOS Worker (e.g., 518A) as described in block 612, in certain embodiments, at block 614, the process 600 involves receiving, by the declarative provisioner, a trigger from the worker implementation that causes the declarative provisioner to resume execution of the deployment of the resource using the (modified) state information. In certain embodiments, the time interval at which CIOS Worker 518A is configured to trigger an execution of CIOS Declarative Provisioner 520 may be pre-configured and scheduled by CIOS Executor 510. In certain instances, for optimal operation of the CIOS Declarative Provisioner 520, CIOS Executor 510 may pre-configure CIOS Worker 518A to trigger an execution of the CIOS Declarative Provisioner 520 when the appropriate event (identified in the yield condition) occurs. However, since CIOS Executor 510 may not be aware of the exact timing of the occurrence of the event, CIOS Executor 510 may configure CIOS Worker 518A to trigger the execution of the CIOS Declarative Provisioner 520 at regular intervals (e.g., every 'n' seconds where 'n' can be in the order of 30 seconds). Additional details of the operations performed by the CIOS Declarative Provisioner to resume execution of the deployment of the resource upon receiving a trigger from a CIOS Worker are described in FIG. 7.

At block 616, the process 600 involves transmitting, by the declarative provisioner, deployment information corresponding to the deployment of the resource to the worker implementation. As noted above, the deployed resource information (e.g., 534) may include information about the infrastructure resources that may be used by a user of the CIOS Regional System.

Figure 7:
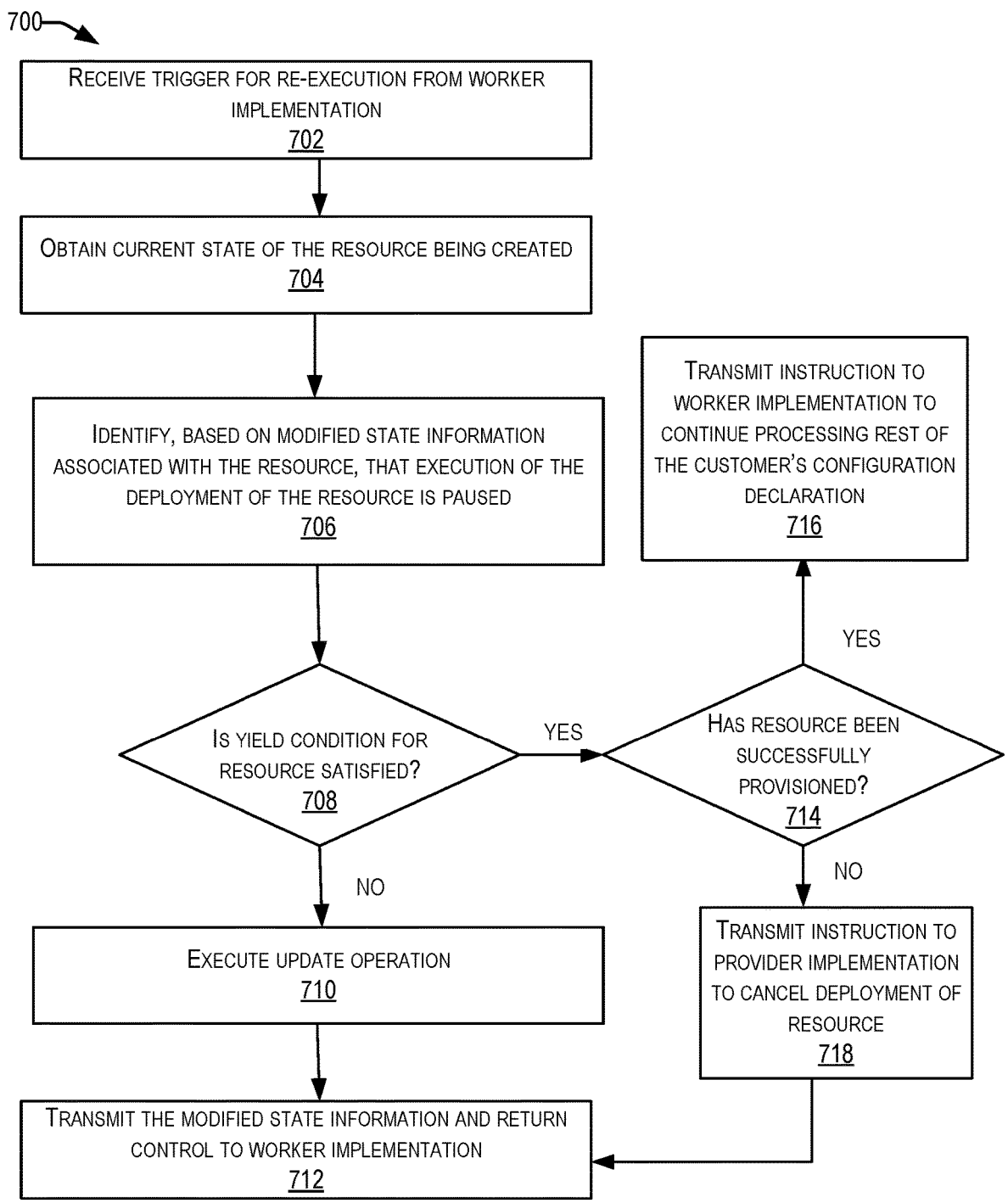
FIG. 7 illustrates an example flow diagram showing a process of the operations performed by the CIOS Declarative Provisioner shown in FIG. 5 to resume execution of deployment of an infrastructure resource, according to according to certain embodiments.

FIG. 7 illustrates an example flow diagram showing a process 700 of the operations performed by the CIOS Declarative Provisioner shown in FIG. 5 to resume an execution of a deployment of a resource, according to according to certain embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 700 may be performed by a plurality of processors in parallel. The computer-readable storage medium may be non-transitory.

In certain embodiments, such as in the embodiments depicted in FIG. 5 and FIG. 6, the processing depicted in blocks 702-718 in FIG. 7 may be performed by CIOS Declarative Provisioner 520 upon receiving a trigger from the worker implementation (e.g., CIOS Worker 518A) as a result of executing block 614 in FIG. 6.

The process 700 begins at block 702, when the declarative provisioner (e.g., CIOS Declarative Provisioner 520) receives a trigger from the worker implementation (e.g., CIOS Worker 518A) to resume execution of deployment of the resource. At block 704, the declarative provisioner obtains the current state of the resource being created. In certain examples, the operations performed at block 704 may involve, executing, by CIOS Declarative Provisioner 520, a "Refresh" operation to obtain the current state of its resources based on the modified state information stored in the state file.

At block 706, the process 700 involves, identifying, by the declarative provisioner, based on the modified state information, that the execution of the deployment of the resource is paused. For example, based on the modified state information of the resource stored in the state file, CIOS Declarative Provisioner 520 may identify that the resource that it is attempting to create is "un-tainted" and that a "yield state" associated with the resource is set.

At block 708, the process 700 involves, determining, by the declarative provisioner, based on the modified state information, if a "yield condition" associated with the deployment of the resource is satisfied. If the "yield condition" is not satisfied (indicating that the appropriate event identified in the yield condition has not yet occurred), the process 700 proceeds to block 710.

At block 710, the process 700 involves, executing, by the declarative provisioner, an "update" operation on the resource being deployed. Since the resource is marked "un-tainted," the declarative provisioner is not forced to delete (destroy) and re-create a resource that is in the middle of being provisioned when it is triggered by the worker implementation. In certain examples, as a result of executing the update operation, declarative provisioner updates the "yield state" associated with the resource to indicate that the resource is still yielding.

At block 712, the declarative provisioner transmits the modified state information to the worker implementation and returns control to the worker implementation.

In certain embodiments, at block 708, if the declarative provisioner determines that the "yield condition" associated with the deployment of the resource is satisfied, at block 714, the declarative provisioner determines if the resource has been successfully provisioned. If the resource has not been successfully provisioned, then at block 718, the declarative provisioner transmits an instruction to the provider implementation to cancel the deployment of the resource. At block 712, the declarative provisioner updates the state of the resource to "CANCELLED" and transmits the modified state information (including the modified state of the resource) to the worker implementation. The worker implementation then proceeds to update the state of the currently executing task and communicates the task state to CIOS Executor 510.

If the resource has been successfully provisioned, then at block 716, the declarative provisioner transmits an instruction to the worker implementation that the resource is no longer yielding and to continue processing the rest of the customer's configuration declaration. The worker implementation then updates the state file by re-setting the "yield state" of the resource to indicate that execution of the long running task has been successfully completed. CIOS Executor 510 tracks the overall Execution of the Plan and identifies a CIOS Worker to execute the next Task identified in the Plan.

In the embodiments described in FIGS. 5-7 above, the worker implementation (e.g., CIOS Worker 518A) was configured to preserve the state of a "yielded" Task currently being executed by CIOS Declarative Provisioner 520 by "un-tainting" (i.e., by removing the "taint flag" of) the resource. Since, the resource was "un-tainted," the declarative provisioner was not forced to delete (destroy) and re-create the resource that was in the middle of being provisioned. In alternate embodiments, CIOS Declarative Provisioner 520 may itself be configured to preserve the state of its "yielded" Task by associating a "yield state" to the resource being created. Additionally, in this implementation, CIOS Declarative Provisioner 520 is configured to, by default, mark the resource as "tainted." Upon receiving a trigger from the worker implementation to be re-executed, CIOS Declarative Provisioner 520 tries to invoke a "Delete" operation followed by a "Create" operation to delete and re-create the resource since the resource is marked "tainted." In certain embodiments, the CIOS Declarative Provisioner is configured to treat the "Delete" and "Create" operations as "Ignore" and "Resume" operations respectively. For example, as a result of executing the "Ignore" operation, the CIOS Declarative Provisioner is able to obtain the modified state information associated with the resource and determine if the "yield condition" associated with the resource is satisfied. If the "yield condition" is not satisfied, the CIOS Declarative Provisioner executes a "Resume" operation. The "Resume" operation enables the CIOS Declarative Provisioner to update the "yield state" associated with the resource to indicate that the resource is still yielding. If the "yield condition" is satisfied, the CIOS Declarative Provisioner transmits an instruction to the worker implementation that the resource is no longer yielding and to continue processing the rest of the customer's configuration declaration.

Illustrative Systems

Figure 8:
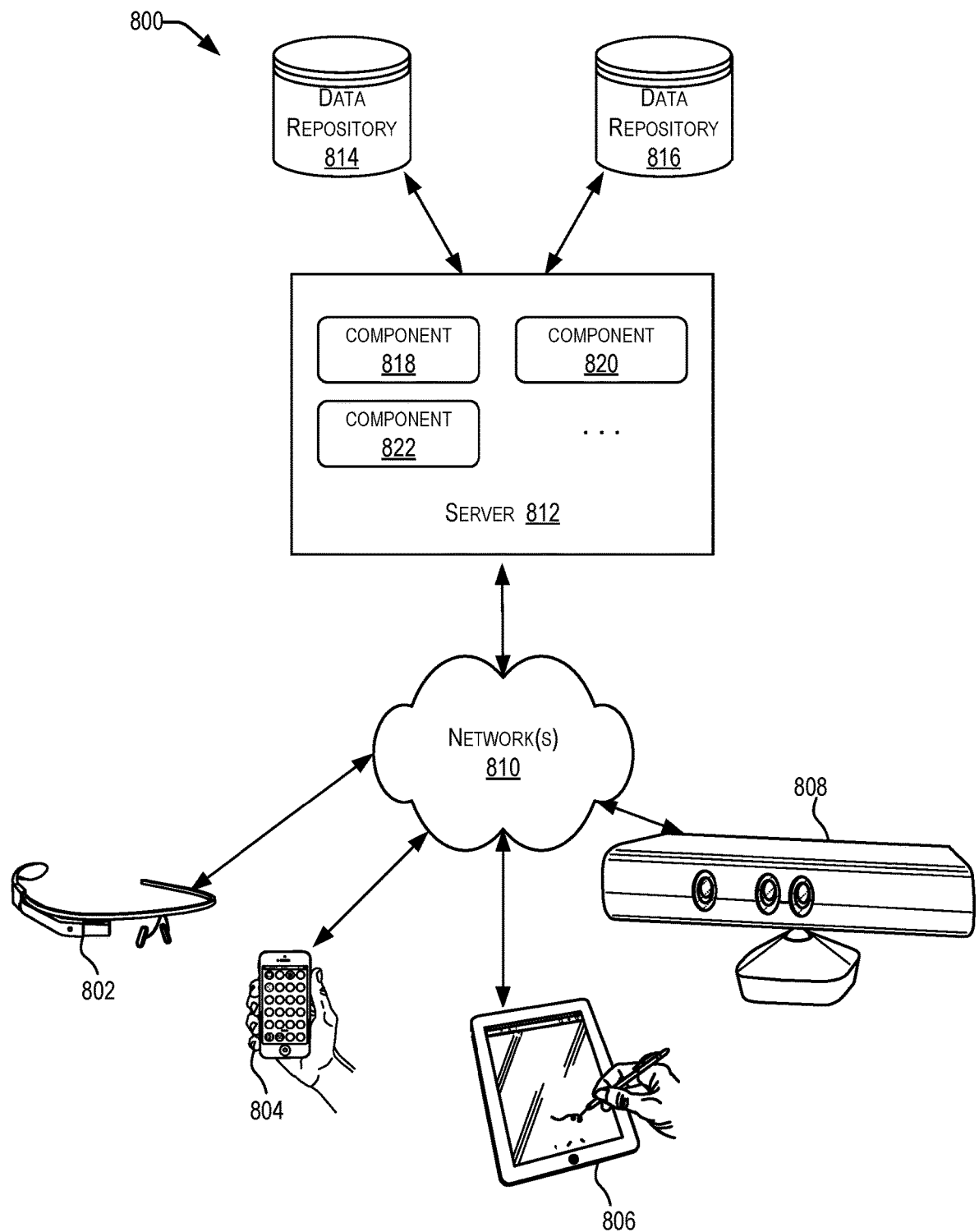
FIG. 8 is a block diagram of a distributed system, according to at least one embodiment.
Figure 9:
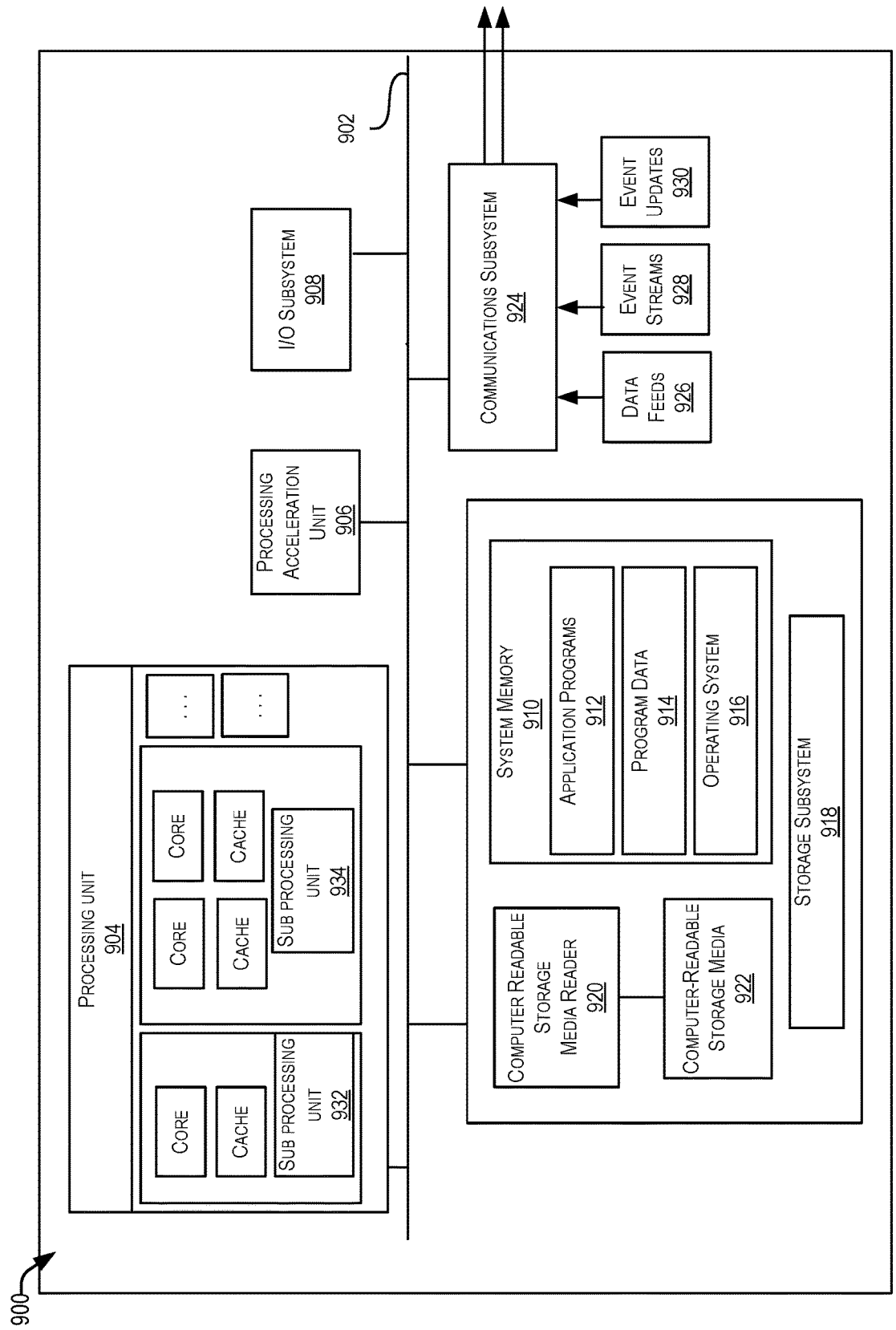
FIG. 9 is a block diagram of one or more components of a system environment by which services provided by one or more components of an embodiment system may be offered as cloud services, according to at least one embodiment.
Figure 10:
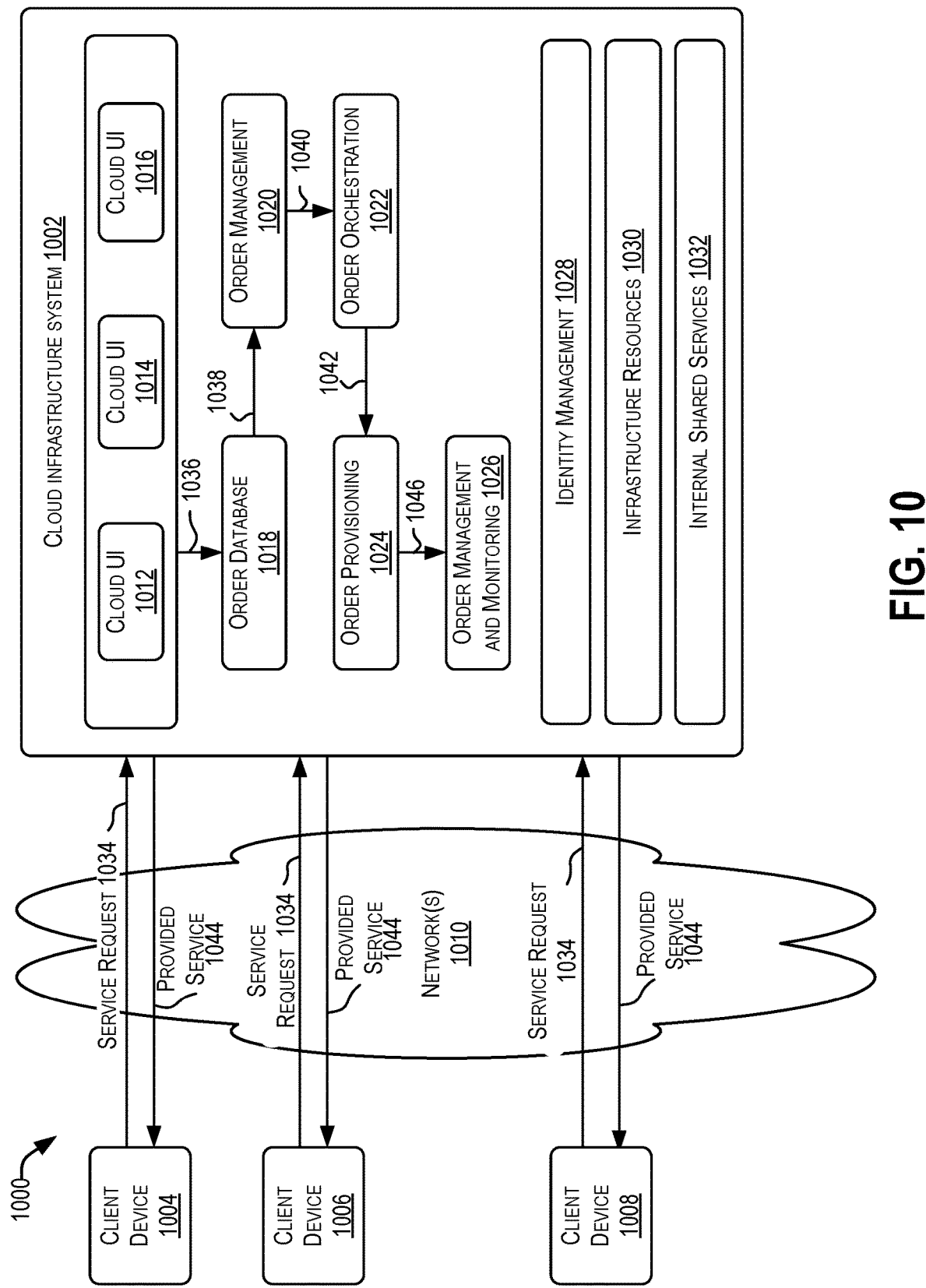
FIG. 10 is a block diagram of an example computer system, in which various embodiments of the present disclosure may be implemented.

FIGS. 8-10 illustrate aspects of example environments for implementing aspects of the present disclosure in accordance with various embodiments. FIG. 8 depicts a simplified diagram of a distributed system 800 for implementing an embodiment of the present disclosure. In the illustrated embodiment, the distributed system 800 includes one or more client computing devices 802, 804, 806, and 808, which are configured to execute and operate a client application such as a web browser, proprietary client (e.g., Oracle Forms), or the like over one or more network(s) 810. The server 812 may be communicatively coupled with the remote client computing devices 802, 804, 806, and 808 via network 810.

In various embodiments, the server 812 may be adapted to run one or more services or software applications such as services and applications that provide resource provisioning and deployment services. In certain embodiments, the server 812 may also provide other services or software applications can include non-virtual and virtual environments. In some embodiments, these services may be offered as web-based or cloud services or under a Software as a Service (SaaS) model to the users of the client computing devices 802, 804, 806, and/or 808. Users operating the client computing devices 802, 804, 806, and/or 808 may in turn utilize one or more client applications to interact with the server 812 to utilize the services provided by these components.

In the configuration depicted in FIG. 8, the software components 818, 820 and 822 of system 800 are shown as being implemented on the server 812. In other embodiments, one or more of the components of the system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

The client computing devices 802, 804, 806, and/or 808 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 810.

Although distributed system 800 in FIG. 8 is shown with four client computing devices, any number of client computing devices may be supported. Other devices, such as devices with sensors, etc., may interact with the server 812.

The network(s) 810 in the distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 812 can include one or more virtual machines running virtual operating systems, or other computing architectures involving virtualization. One or more flexible pools of logical storage devices can be virtualized to maintain virtual storage devices for the server. Virtual networks can be controlled by the server 812 using software defined networking. In various embodiments, the server 812 may be adapted to run one or more services or software applications described in the foregoing disclosure. For example, the server 812 may correspond to a server for performing processing as described above according to an embodiment of the present disclosure.

The server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 812 may include one or more applications to analyze and consolidate data feeds and/or event updates received from users of the client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 812 may also include one or more applications to display the data feeds and/or real-time events via one or more display devices of the client computing devices 802, 804, 806, and 808.

The distributed system 800 may also include one or more databases 814 and 816. These databases may provide a mechanism for storing information such as user identity information, configuration files, state information and other information used by embodiments of the present disclosure. Databases 814 and 816 may reside in a variety of locations. By way of example, one or more of databases 814 and 816 may reside on a non-transitory storage medium local to (and/or resident in) the server 812. Alternatively, the databases 814 and 816 may be remote from the server 812 and in communication with the server 812 via a network-based or dedicated connection. In one set of embodiments, the databases 814 and 816 may reside in a storage-area network (SAN). Similarly, any necessary files for performing the functions attributed to the server 812 may be stored locally on the server 812 and/or remotely, as appropriate. In one set of embodiments, the databases 814 and 816 may include relational databases, such as databases provided by Oracle, that are adapted to store, update, and retrieve data in response to SQL-formatted commands.

FIG. 9 illustrates an example computer system 900 that may be used to implement an embodiment of the present disclosure. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for dynamically modifying documents (e.g., webpages) responsive to usage patterns.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may be stored in the ROM. The RAM may contain data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. Additionally, communication subsystem 924 may be used to communicate notifications of successful logins or notifications to re-enter a password from the privileged account manager to the requesting users.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the disclosure. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 802, 804, 806, and 808.

Although example system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 610.

Cloud infrastructure system 1002 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet or from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In example operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002. At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A computer-implemented method, comprising:
   executing, by a declarative provisioner, deployment of a resource;

instructing, by the declarative provisioner, an error message to be returned based on determining that the deployment of the resource is a long-running task;

storing, by the declarative provisioner, state information corresponding to the deployment of the resource based at least in part on the error message;

instructing, by the declarative provisioner, the error message to be treated as a yield instruction, the yield instruction indicating that execution of the deployment of the resource is paused;

receiving, by the declarative provisioner, a trigger that causes the declarative provisioner to resume execution of the deployment of the resource using the state information; and responsive to the trigger, transmitting, by the declarative provisioner, deployment information corresponding to the deployment of the resource to a worker node.

2. The computer-implemented method of claim 1, wherein determining that the deployment of the resource is a long-running task comprises identifying that an execution time for deploying the resource exceeds a threshold amount of time.

3. The computer-implemented method of claim 1, wherein the error message indicates that the execution of the deployment of the long running task has been paused.

4. The computer-implemented method of claim 1, further comprising:

updating, by the declarative provisioner, the state information based at least in part on the error message to generate modified state information corresponding to the deployment of the resource, wherein the modified state information comprises at least one of:

a modified state of the resource being created;

a logical identifier associated with the resource being created; and a yield state or a yield condition associated with the resource being created.

5. The computer-implemented method of claim 4, wherein instructing, by the declarative provisioner, the error message to be treated as a yield instruction comprises:

receiving, by the worker node, the modified state information corresponding to the deployment of the resource; and identifying, by the worker node, based at least in part on the modified state information, the yield state and the yield condition associated with the resource being deployed.

6. The computer-implemented method of claim 5, further comprising:

identifying, by the worker node, and based at least in part on the modified state information, the logical identifier of the resource being deployed; and marking, by the worker node, the identified resource as un-tainted in the modified state information using the logical identifier associated with the resource.

7. The computer-implemented method of claim 4, wherein receiving, by the declarative provisioner, the trigger further comprises:

identifying, by the declarative provisioner, based at least in part on the modified state information, that the execution of the deployment of the resource is paused;

determining, by the declarative provisioner, that the yield condition associated with the deployment of the resource is not satisfied; and responsive to the determining, executing, by the declarative provisioner, an update operation on the resource being deployed;

responsive to executing the update operation, updating, by the declarative provisioner, the modified state information; and transmitting, by the declarative provisioner, the modified state information to the worker node.

8. The computer-implemented method of claim 7, wherein identifying, based at least in part on the modified state information, that the execution of the deployment of the resource is paused comprises identifying, by the declarative provisioner, that the resource is untainted and that a yield state associated with the resource is set.

9. The computer-implemented method of claim 7, wherein executing the update operation comprises updating the yield state associated with the resource in the modified state information to indicate that the resource is still yielding.

10. The computer-implemented method of claim 4, wherein receiving, by the declarative provisioner, the trigger comprises:

identifying, by the declarative provisioner, based at least in part on the modified state information, that the execution of the deployment of the resource is paused;

determining, by the declarative provisioner, that the yield condition associated with the resource is satisfied;

determining, by the declarative provisioner, that the resource has been successfully created;

responsive to determining that the resource has been successfully created, modifying, by the declarative provisioner, the yield state associated with the resource in the modified state information to indicate that the resource is no longer yielding; and transmitting, by the declarative provisioner, the modified state information to the worker node.

11. A cloud infrastructure orchestration system, comprising:

a processor; and a memory storing instructions that, when executed by the processor, configure the cloud infrastructure orchestration system to:

execute, by a declarative provisioner, deployment of a resource;

instruct, by the declarative provisioner, an error message to be returned based on determining that the deployment of the resource is a long-running task;

store, by the declarative provisioner, state information corresponding to the deployment of the resource based at least in part on the error message;

instruct, by the declarative provisioner, the error message to be treated as a yield instruction, the yield instruction indicating that execution of the deployment of the resource is paused;

receive, by the declarative provisioner, a trigger that causes the declarative provisioner to resume execution of the deployment of the resource using the state information; and responsive to the trigger, transmit, by the declarative provisioner, deployment information corresponding to the deployment of the resource to a worker node.

12. The system of claim 11, wherein the instructions to determine that the deployment of the resource is a long-running task comprises identifying that an execution time for deploying the resource exceeds a threshold amount of time.

13. The system of claim 11, further comprising instructions to:

update by the declarative provisioner, the state information based at least in part on the error message to generate modified state information corresponding to the deployment of the resource, wherein the modified state information comprises at least one of:
- a modified state of the resource being created;
- a logical identifier associated with the resource being created; and
- a yield state or a yield condition associated with the resource being created.

14. The system of claim 13, wherein instructing, by the declarative provisioner, the error message to be treated as a yield instruction comprises instructions to:
receive, by the worker node, the modified state information corresponding to the deployment of the resource; and
identify, by the worker node, based at least in part on the modified state information, the yield state and the yield condition associated with the resource being deployed.

15. The system of claim 14, further comprising instructions to:
identify, by the worker node, and based at least in part on the modified state information, the logical identifier of the resource being deployed; and
mark, by the worker node, the identified resource as un-tainted in the modified state information using the logical identifier associated with the resource.

16. A non-transitory computer-readable medium having program code that is stored thereon, the program code executable by one or more processing devices for performing operations comprising:
executing deployment of a resource;
instructing an error message to be returned based on determining that the deployment of the resource is a long-running task;
storing state information corresponding to the deployment of the resource based at least in part on the error message;
instructing the error message to be treated as a yield instruction, the yield instruction indicating that execution of the deployment of the resource is paused;
receiving a trigger that causes the deployment of the resource to be resumed using the state information; and
responsive to the trigger, transmitting deployment information corresponding to the deployment of the resource to a worker implementation.

17. The computer-readable storage medium of claim 16, wherein receiving the trigger further comprises:
identifying, based at least in part on modified state information, that the execution of the deployment of the resource is paused;
determining that the yield condition associated with the deployment of the resource is not satisfied; and
responsive to the determining, executing an update operation on the resource being deployed;
responsive to executing the update operation, updating, the modified state information; and
transmitting the modified state information to the worker implementation.

18. The computer-implemented method of claim 17, wherein identifying, based at least in part on the modified state information, that the execution of the deployment of the resource is paused comprises identifying that the resource is untainted and that a yield state associated with the resource is set.

19. The computer-implemented method of claim 17, wherein executing the update operation comprises updating the yield state associated with the resource in the modified state information to indicate that the resource is still yielding.

20. The computer-implemented method of claim 16, wherein receiving the trigger comprises:
identifying based at least in part on modified state information, that the execution of the deployment of the resource is paused;
determining that the yield condition associated with the resource is satisfied;
determining that the resource has been successfully created;
responsive to determining that the resource has been successfully created, modifying the yield state associated with the resource in the modified state information to indicate that the resource is no longer yielding; and
transmitting the modified state information to the worker node.

* * * * *

UNITED STATES PATENT AND TRADEMARK OFFICE
CERTIFICATE OF CORRECTION

| | |
|---|---|
| PATENT NO. | : 11,740,943 B2 |
| APPLICATION NO. | : 17/939813 |
| DATED | : August 29, 2023 |
| INVENTOR(S) | : Vassenkov et al. |

It is certified that error appears in the above-identified patent and that said Letters Patent is hereby corrected as shown below:

In the Specification

In Column 4, Line 67, delete "like." and insert -- like). --, therefor.

In Column 8, Line 10, delete ""$manualApproval"" " and insert -- "$manualApproval". --, therefor.

In Column 8, Line 13, delete "Available" and insert -- available --, therefor.

In Column 11, Line 44, delete "nodes" and insert -- nodes. --, therefor.

In Column 11, Line 46, delete "available" and insert -- available. --, therefor.

In Column 11, Line 48, delete "clients" and insert -- clients. --, therefor.

In Column 26, Line 4, delete "(Internet" and insert -- (Internetwork --, therefor.

In Column 30, Line 38, delete "evolution)," and insert -- evolution)), --, therefor.

In the Claims

In Column 40, Line 4, in Claim 17, delete "computer-readable storage medium" and insert -- non-transitory computer-readable medium --, therefor.

In Column 40, Line 17, in Claim 18, delete "computer-implemented method" and insert -- non-transitory computer-readable medium --, therefor.

In Column 40, Line 22, in Claim 19, delete "computer-implemented method" and insert -- non-transitory computer-readable medium --, therefor.

Signed and Sealed this
Eighteenth Day of June, 2024

Katherine Kelly Vidal
*Director of the United States Patent and Trademark Office*

In Column 40, Line 27, in Claim 20, delete "computer-implemented method" and insert -- non-transitory computer-readable medium --, therefor.